US005689081A

United States Patent [19]
Tsurumi

[11] Patent Number: 5,689,081
[45] Date of Patent: Nov. 18, 1997

[54] NETWORK KARAOKE SYSTEM OF BROADCAST TYPE HAVING SUPPLEMENTARY COMMUNICATION CHANNEL

[75] Inventor: Kanehisa Tsurumi, Hamamatsu, Japan

[73] Assignee: Yamaha Corporation, Hamamatsu, Japan

[21] Appl. No.: 641,495

[22] Filed: May 1, 1996

[30] Foreign Application Priority Data

May 2, 1995 [JP] Japan ................. 7-108828

[51] Int. Cl.⁶ ............. A63H 5/00; G04B 13/00; G10H 7/00
[52] U.S. Cl. ............. 84/609; 434/307 A; 455/6.3; 455/15
[58] Field of Search ............. 84/600, 601, 609, 84/610, 634; 434/307 A; 455/3.3, 5.1, 6.3, 8, 12.1, 15

[56] References Cited

U.S. PATENT DOCUMENTS

| | | |
|---|---|---|
| 5,007,055 | 4/1991 | Isono et al. . |
| 5,046,004 | 9/1991 | Tsumura et al. ............. 84/645 X |
| 5,161,194 | 11/1992 | Ujiie . |
| 5,252,775 | 10/1993 | Urano ............. 84/645 |
| 5,532,923 | 7/1996 | Sone . |
| 5,594,490 | 1/1997 | Dawson et al. . |
| 5,613,192 | 3/1997 | Ikami et al. . |

*Primary Examiner*—William M. Shoop, Jr.
*Assistant Examiner*—Jeffrey W. Donels
*Attorney, Agent, or Firm*—Loeb & Loeb LLP

[57] ABSTRACT

In a network karaoke system, a center station transmits song data, and a plurality of karaoke terminals communicate with the center station to receive therefrom the song data so that each karaoke terminal can provide a karaoke service based on the received song data. The center station has a first transmitter that broadcasts the song data to transmit the same simultaneously to all of the karaoke terminals, and a second transmitter that responds to a request from each karaoke terminal to individually transmit the song data to each karaoke terminal. Each karaoke terminal has a first receiver that is capable of receiving the song data broadcasted by the center station, a detector that detects when the first receiver has failed to receive the broadcasted song data for communicating with the center station to notify thereto the request for re-transmission of the song data, and a second receiver that receives the song data re-transmitted from the second transmitter of the center station in response to the request.

8 Claims, 5 Drawing Sheets

FIGURE 3

| 95. | 04. | 18. | 11 : 15 |
| 95. | 04. | 19 | 11 : 45 |
| 95. | 04. | 21. | 10 : 55 |
| 95. | 04. | 21. | 11 : 35 |
| ------- | ------- | ------- | ------- |
| ------- | ------- | ------- | ------- |
| ------- | ------- | ------- | ------- |
| 95. | 04. | 24. | 11 : 15 |

NETWORK KARAOKE SYSTEM OF BROADCAST TYPE HAVING SUPPLEMENTARY COMMUNICATION CHANNEL

BACKGROUND OF THE INVENTION

The present invention relates to a network karaoke system in which a center station distributes song data to a multiple of karaoke terminals.

In the prior art, there is known a network karaoke system, in which a central or host station having a database of song data distributes song data via a communication network such as a public telephone network to retailers such as karaoke bars on demand. In such a system, the communication cost tends to be expensive if the number of the retailers is great. Network usage charge is required for each call of the song data transmission.

By the way, in the prior art, there is known a multicast data communication network to transmit data from a master station to slave stations simultaneously via a communication satellite. Such a system is generally suitable for feeding common data to a multiple of peripheral stations. The multicast or broadcast system is put in practice widely over various application fields.

The inventor of the present invention has attempted to employ the multicast communication system in the network karaoke system having many peripheral stations or karaoke terminals, in order to realize efficient and inexpensive song data distribution to the peripheral stations. However, such a multicast song data distribution system is found to have problems that some items of the song data may be dropped in the transmission, if the peripheral station is not ready to receive the song data at a transmission timing, or if incidental communication error occurs. Further, the system lacks any recovery means to send missing song data again to the peripheral stations.

SUMMARY OF THE INVENTION

The present invention is conceived based on the background described above, and its purpose is to realize efficient and inexpensive song data distribution to a multiple of peripheral karaoke stations, and to prevent song data missing in the song data distribution.

In a general form of the invention, a network karaoke system comprises a center station which transmits song data, and a plurality of karaoke terminals which communicate with the center station to receive therefrom the song data so that each karaoke terminal can provide a karaoke service based on the received song data. The center station comprises a first transmitter that broadcasts the song data to transmit the same simultaneously to all of the karaoke terminals, and a second transmitter that responds to a request from each karaoke terminal to individually transmit the song data to each karaoke terminal. Each karaoke terminal comprises a first receiver that is capable of receiving the song data broadcasted by the center station, a detector that detects when the first receiver has failed to receive the broadcasted song data for communicating with the center station to notify thereto the request for re-transmission of the song data, and a second receiver that receives the song data re-transmitted from the second transmitter of the center station in response to the request.

In a specific form, the network karaoke system according to the present invention comprises a center station which distributes song data to a multiple of karaoke terminals, while each karaoke terminal synthesize a musical sound according to the distributed song data, and mixes the synthesized musical sound with a vocal sound picked up by a microphone. The center station comprises first transmitter means to multicast song data to deliver the same to the karaoke terminals, and second transmitter means to transmit song data to each karaoke terminal through a bidirectional wired communication network in response to a request from the karaoke terminals. Each karaoke terminal comprises first receiver means to receive the song data multicasted by the center station, means storing a distribution schedule table to keep information concerning the song data to be delivered, detector means to detect existence of missing song data in the delivered song data according to the information kept in the distribution schedule table and according to results of song data reception by the first receiver means, re-transmission requesting means to issue a request for the center station to re-transmit the missing song data detected by the detector means, and second receiver means to receive the missing song data transmitted from the center station in response to the issued request through the bidirectional wired communication network.

In operation, the center station multicasts or broadcasts song data to deliver the same to the karaoke terminals by the first transmitter means, while the karaoke terminals receive the song data multicasted from the center station by the first receiver means. The karaoke terminal detects existence of missing song data in the delivered song data according to the information stored in the distribution schedule table and according to the results of the data reception through the first receiver means. If there is any missing song data during the song data transmission, the karaoke terminal requests the center station to re-transmit the missing song data through the bidirectional wired communication network. On the other hand, the center station transmits the missing song data through the bidirectional wired communication network in response to the request from the karaoke terminal using the second transmitter means. Thus, the karaoke terminal can receive the missing song data transmitted from the center station in response to the re-transmission request through the bidirectional wired communication network by the second receiver means.

BRIEF DESCRIPTION OF THE DRAWINGS

FIG. 3 shows an example of a format of a distribution schedule table.

DETAILED DESCRIPTION OF THE INVENTION

Details of embodiments of a network karaoke system according to the present invention will now be described with reference to the drawings.

Figure 1:
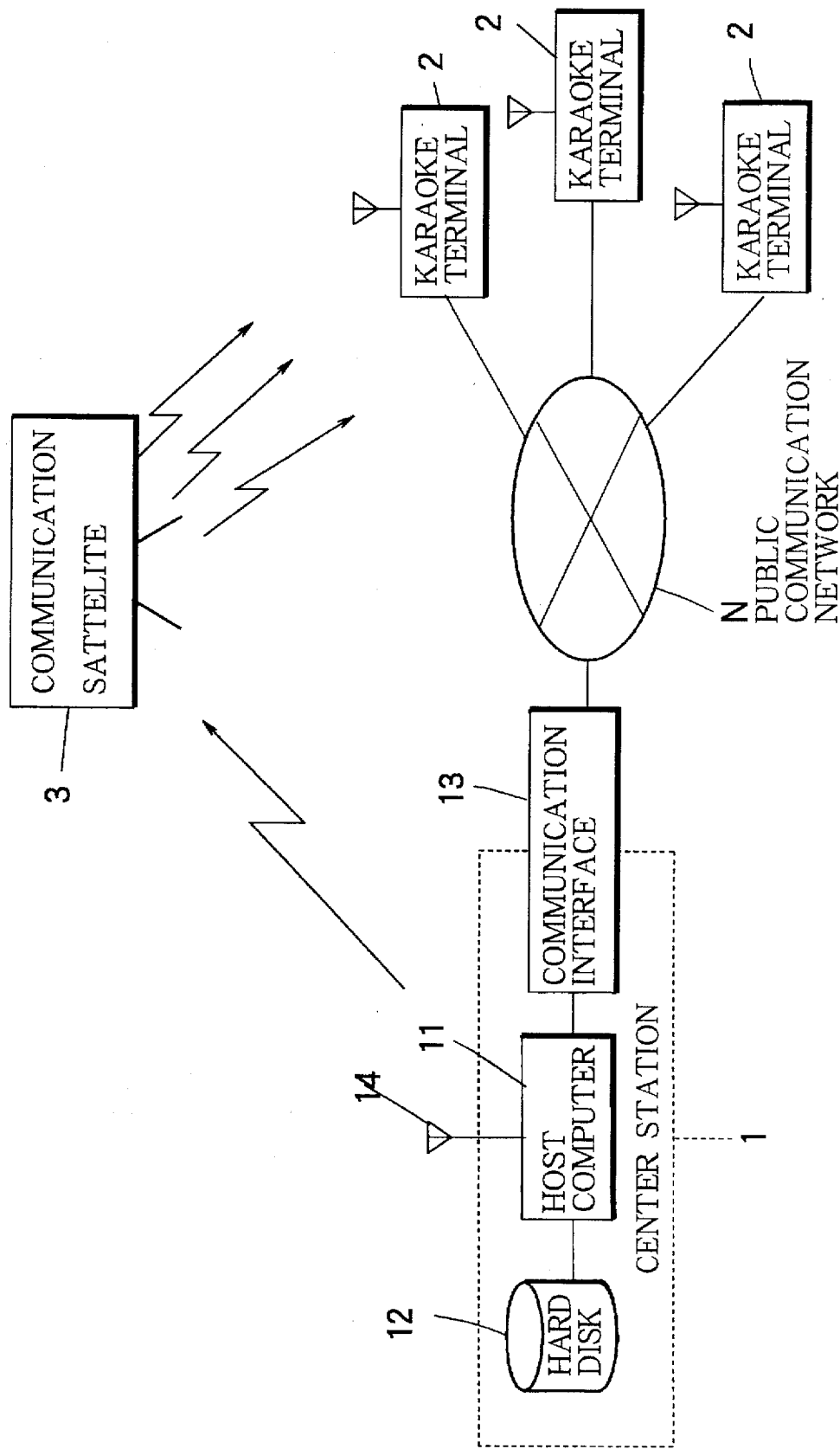
FIG. 1 is a schematic block diagram of a network karaoke system as an embodiment according to the present invention.

FIG. 1 shows overall structure of a network karaoke system as an embodiment of the present invention. In the Figure, numeral 1 denotes a center or host station accommodating a database of karaoke song data. The center station 1 is comprised of a host computer 11, a hard disk 12, a communication interface 13 for a public communication network such as a public telephone network or ISDN, and a first transmitter 14 to broadcast or multicast a wireless signal representing the karaoke song data via a communication satellite 3 simultaneously. The communication interface 13 functions as a second transmitter to transmit the song data through the public communication network N. Numerals 2, 2, denote a multiple of karaoke terminals or stations as a recipient of the karaoke song data. These karaoke terminals 2, 2, ... are connected to the center station 1 via the public communication network N, and have a receiver to receive the wireless signal containing the karaoke song data.

Figure 2:
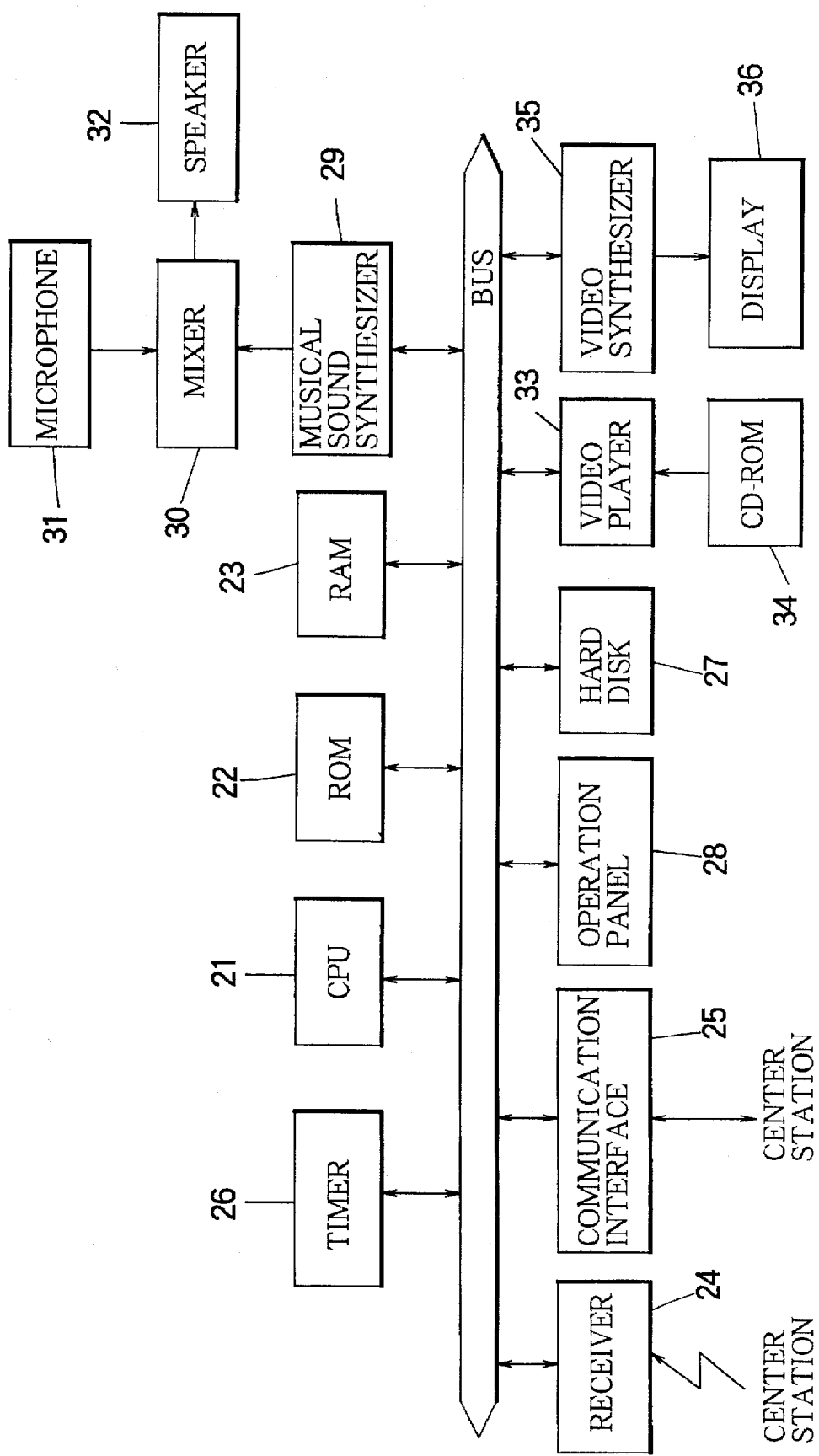
FIG. 2 is a schematic block diagram showing structure of a karaoke terminal in the embodiment.

Structure of each karaoke terminal 2 will be described hereunder with reference to FIG. 2. In FIG. 2, numeral 21 denotes a CPU to control various circuit blocks connected to a bus. Numeral 22 denotes a ROM to store control programs executed by the CPU 21, and font data used to display lyric data included in the karaoke song data. Numeral 23 denotes a RAM used as a work area of the CPU 21. The RAM 23 stores a distribution schedule table to administrate reception and admission of the song data transmitted from the center station 1. The configuration of the distribution schedule table will be described later in detail. Numeral 24 denotes a first receiver to receive the wireless signal which carries the karaoke song data. Numeral 25 denotes a second receiver in the form of a communication interface for the public communication network N. Numeral 26 denotes a timer to count a date and time. The CPU 21 recognizes an arrival date or timestamp of the song data according to clock information from the timer 26. Numeral 27 denotes a hard disk to store a file of the song data delivered from the center station 1. In other words, the song data distributed by the center station 1 is stored in a database of the karaoke terminal implemented in the hard disk 27.

Numeral 28 denotes an operation panel which outputs control signals corresponding to various user operation inputs to the CPU 21. With the operation panel 28, an operator inputs commands to control basic operation of the karaoke terminal such as song selection, starting and stopping of karaoke song performance, and adjustment of volume, tempo etc. Further, the operator can command the CPU 21 to communicate with the center station 1.

Numeral 29 denotes a synthesizer to generate or synthesize a musical sound signal in response to performance data included in the song data which is fed from the CPU 21. Further, the musical sound synthesizer 29 feeds the synthesized musical sound signal to a mixer 30. The mixer 30 mixes the musical sound signal generated by the synthesizer 29 and a vocal sound signal picked up by a microphone 31 with each other, and acoustically reproduces the mixed audio signal through a speaker 32.

Numeral 33 denotes a video player to read out compressed video data from a CD-ROM 34, to decompress the read video data, and to send the decompressed video data to a video synthesizer 35. The video synthesizer 35 superimposes a background picture represented by the video data distributed from the video player 33 over lyric words represented by character fonts arranged according to lyric information provided from the CFU 21, and displays the superimposed image of the background picture and the lyric words on a screen of a display 36.

The configuration of the distribution schedule table will now be described hereunder. As shown in FIG. 3, the distribution schedule table stores all dates and times of the song data distribution scheduled in the center station 1 with respect to a certain delivery period, e.g., one week. For examples a top column "95.04.18.11:15" in the table of FIG. 3 indicates that data distribution of one item of the karaoke song data is scheduled at 11:15 ams on Apr. 18th, 1995. The distribution schedule table is multicasted simultaneously from the center station 1 to the karaoke terminals 2, 2, ... periodically via the communication satellite 3. The karaoke terminal 2 compares the actual date and time of a song data reception derived by accessing the timer 26 at the time of data arrivals with the scheduled date and time reserved in the distribution schedule table. A detector implemented in the karaoke terminal detects whether an object item of the song data is transmitted at the scheduled date and time or not according to the comparison results.

Figure 4:
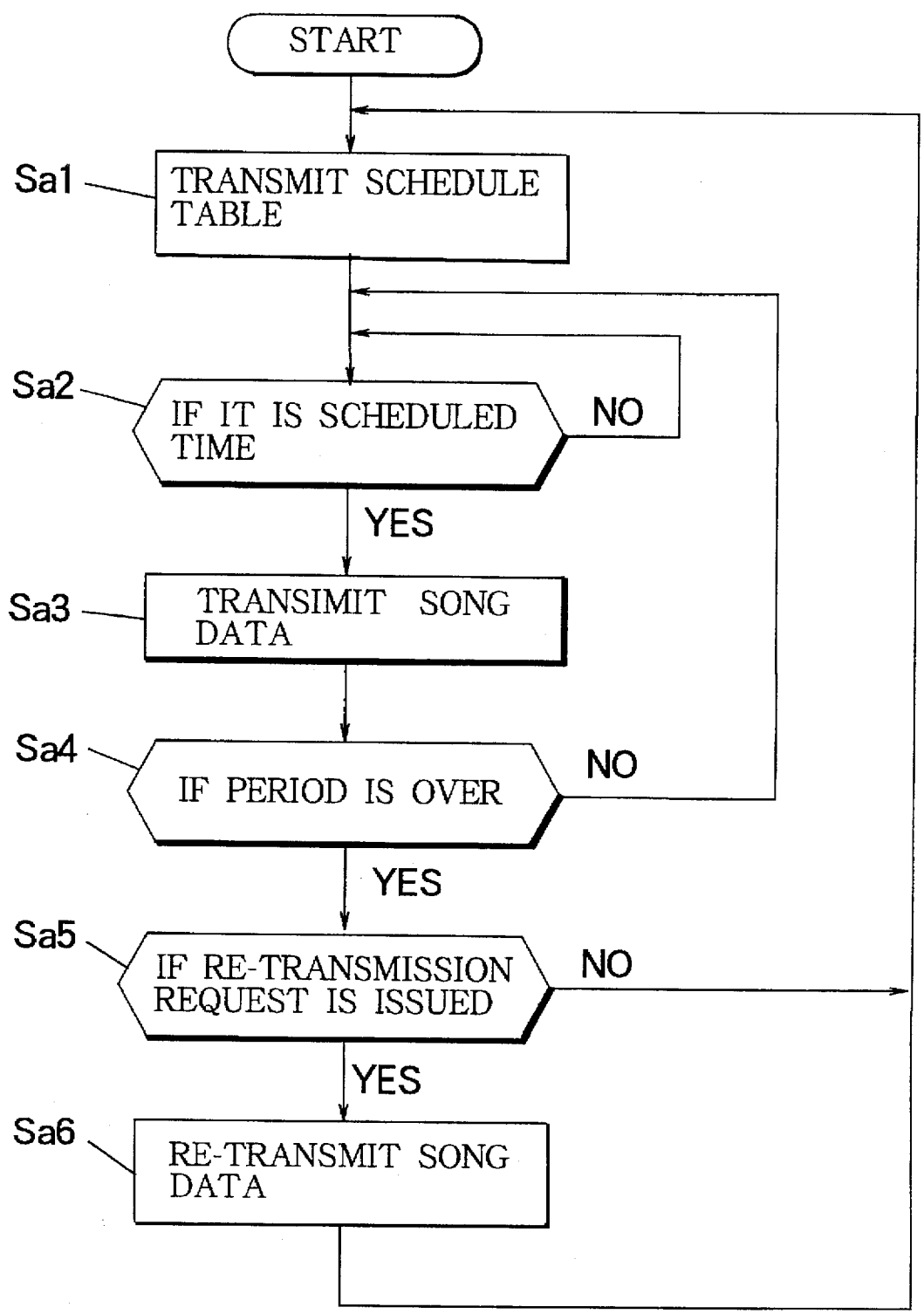
FIG. 4 is a flowchart showing operation of a central station involved in the inventive system.
Figure 5:
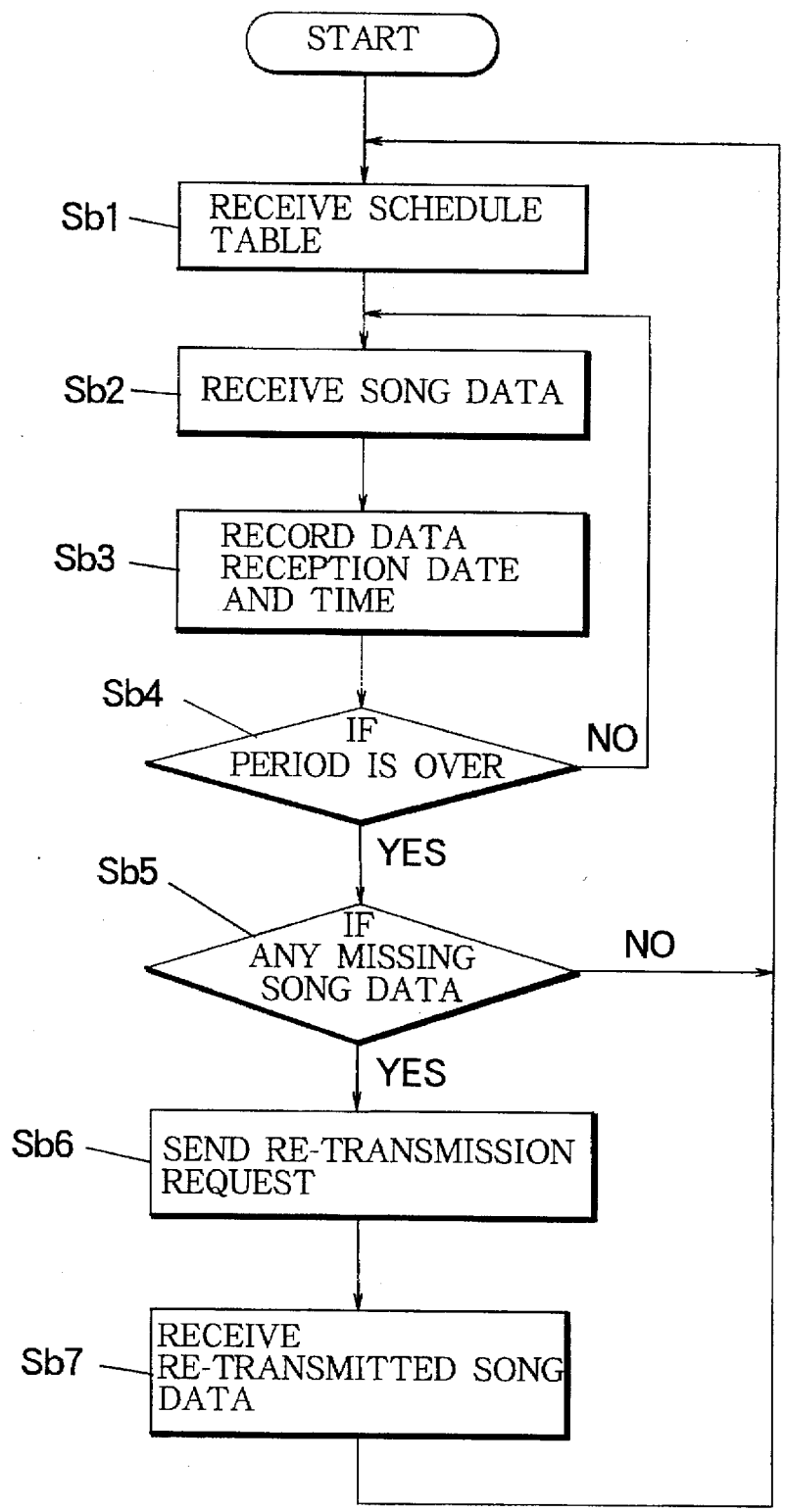
FIG. 5 is a flowchart showing operation of the karaoke terminal.

The operation of the embodiment will now be described hereunder. FIGS. 4 and 5 are flowcharts showing the operation of the center station 1 and the karaoke terminal 2, respectively, in the song data distribution. The operation of the song data distribution will be described hereunder referring to the Figures. In FIG. 4, the center station 1 multicasts the distribution schedule table shown in FIG. 3 via the communication satellite 3 to the karaoke terminals 2, 2, ... . (step Sa1), in order to notify the scheduled dates of the song data transmission periodically, e.g., once a week. As shown in the flowchart of FIG. 5; the karaoke terminals 2, 2, ... receive the distribution schedule table by the receiver 24, and store the received table in a predetermined area other than the area for the song data in the hard disk 27 (step Sb1). Then, the center station 1 multicasts the song data in analogous manner as in the case of the distribution schedule table, at the data and time scheduled by the table (step Sa2, Sa3). The song data transmission is successively carried out at the scheduled timings throughout the distribution period as long as the distribution schedule table is valid for that period (steps Sa2 to Sa4). On the other hand; the karaoke terminal 2 receives the song data in every song data distribution, and stores the received song data in the hard disk 27 (step Sb2). Thus, a new item of the song data is registered in the database of the karaoke terminal 2. The karaoke terminal 2 also derives the clock information from the timer 26 at the data reception timing, and saves the derived clock information as the actual date and time of reception of the song data in a predetermined memory area (other than the area for the song data) of the hard disk 27 (step Sb3). If all items of the song data distributed are received so that there is no missing item of the song data the routine of the center station returns to step Sa1. The karaoke terminal is placed in a standby state for next table distribution. The same procedure is repeated all over again upon receiving a new distribution schedule table (steps Sb2 to Sb4).

If the song data distribution is failed due to incidental reason such as weather condition so that some item of the song data is missing, the karaoke terminal 2 sends a re-transmission request which includes index information specifying the missing song data and identification information of the requesting karaoke terminal via the public communication network to the center station 1 (step Sb6). Upon receiving the re-transmission request (step Sa5), the center station 1 identifies the missing song data requested to be re-transmitted according to the index information in terms of the scheduled date and time of the missing song data included in the request. The center station 1 recognizes correspondence between each item of the song data and its transmission time schedule. Therefore, the center station can readily identify the missing item of the song data according to the index information which specifies the corresponding data and according to time scheduled for the missing item. Then, the center station transmits the identified song data via the public communication network N to the karaoke terminal 2 which has placed the request (step Sa6). Then, returning to step Sa1, the center station 1 transmits another distribution schedule table at the beginning of a next distribution period. On the other hand, if the karaoke terminal 2 does not issue a re-transmission request, the center station 1 returns to the step Sa1 without executing the re-transmission procedure. The above described operation is repeated in every distribution period by updating the distribution schedule table.

The reproduction operation of the karaoke performance in the karaoke terminal 2 is described hereunder. Upon user input of a song selection command, and in response to a start command through the operation panel 28, the CPU 21 loads the relevant song data from the hard disk 27 to the RAM Then, the CPU 21 analyzes the song data, and sends the performance data derived from the analysis to the synthesizer 29. Further, the font data corresponding to the lyric words of the selected song and being derived from the analysis is fed to the video synthesizer 35. The CPU 21 also distributes a song title code included in the song data to the video player The video player 33 loads the video image data corresponding to the song title code from the CD-ROM 34 to the video synthesizer 35. The musical sound signal generated by the synthesizer 29 and the vocal sound signal picked up by the microphone 31 are mixed with each other by the mixer and are reproduced through the speaker 32. On the other hand, the video synthesizer 35 superimposes the video image data and the font data of the lyric words with each other so that the display 36 displays the lyric words of the song and the background image in synchronism with the progress of the karaoke performance.

According to the embodiment described above, the center station 1 multicasts the song data to deliver the same to the karaoke terminals 2, 2, . . . simultaneously via the communication satellite 3. The karaoke terminals 2, 2, . . . check the missing song data in the transmission with reference to the distribution schedule table transmitted in advance so as to request the center station 1 to re-transmit the missing song data via the public communication network N by sending a re-transmission request. Consequently, the efficient, low cost and firm song data distribution is realized and the recovery of the missing song data is assured. In detail, the first transmitter 14 of the center station 1 unidirectionally communicates with the first receiver 24 of each karaoke terminal 2 through a wireless communication channel of the satellite 3 to broadcast the song data. The second transmitter included in the communication interface 13 of the center station 1 can bidirectionally communicate with the second receiver contained in the communication interface 25 of each karaoke terminal 2 through a wired communication channel of the public communication network RT to exchange the re-transmission request and the song data. Further, the center station 1 transmits index information which lists items of the song data to be broadcasted. Each karaoke terminal 2 receives the index information so that the detector checks received items of the song data with reference to the received index information to thereby detect when the first receiver 24 has failed to receive any of the listed items of the song data, which is missing from the received song data. Preferably, the center station 1 transmits the index information in the form of a time schedule which specifies when each item of the song data is to be broadcasted, while the detector detects a missing item of the song data according to the time schedule.

The present invention is not limited to the extent of the embodiment described above, and it can be modified as follows:

(1) In the embodiment above, if the transmission of the distribution schedule table to the karaoke terminals is failed, the karaoke terminals cannot check if there is a missing item of the song data. Considering such situation, the center station 1 may send a list, resume, or summary of information concerning the already transmitted distribution schedule tables periodically to the karaoke terminals 2, 2, . . . via the public communication network N. The karaoke terminals can check a status of the delivery of the table according to the list. Then, the karaoke terminal returns an acknowledgement to the center station when the karaoke terminal safely receives the schedule table. In this arrangement, possibility of faulty transmission of the check list is considerably small since the data volume transferred between the center and peripheral stations is smaller than that of the song data.

(2) To prevent the faulty transmission of the distribution schedule table, the table may be delivered via the public communication network N in place of the broadcast channel.

(3) The transmission interval of the distribution schedule table may be changed due to frequency of the song data distribution. For example, if the song data is distributed frequently in a day, the table may be distributed once a day or more, so that the song data distribution can be checked not on 'date' basis, but on 'time' basis.

(4) The distribution schedule table may be transmitted at a predetermined timing such as beginning of the distribution period.

(5) The content of the distribution schedule table can be modified according to detection methods of the missing song data. In the embodiment above the missing song data is identified in terms of the scheduled date and time of distribution. Otherwise, the missing song data is detected according to the song title code unique to each item of the song data. In such a case, a list, resume, or summary of the song title codes of the song data to be delivered may be transmitted to the karaoke terminals as the index information. Further, the timer 26 can be utilized to monitor a time-up count to each scheduled distribution timing in order to detect whether the song data transmission relevant to the scheduled timing is failed or not.

(6) In the embodiment above, the communication satellite is employed to multicast the song data. Otherwise, any method of wired or wireless multicasting can be optionally employed as the communication medium of the song data transmission.

(7) As access control information for the multicasting, the center station 1 can send key information which controls permission or inhibition of the multicasting service to the karaoke terminals 2, 2, . . . via the public telephone network N.

(8) As the access control information for the public communication network N, a call number of the center station 1 can be multicasted to the karaoke terminals 2, 2, . . . simultaneously.

As discussed in the foregoing, according to the present invention, the center station multicasts the song data to deliver the same to the karaoke terminals, and the karaoke terminals detect existence of missing song data in the delivered song data in order to request the center station to re-transmit the missing song data through the bidirectional wired communication network, so that the reliable song data distribution can be achieved at low cost and the song data missing in the karaoke terminal can be readily recovered.

What is claimed is:

1. A system comprising a center station which transmits song data, and a plurality of karaoke terminals which communicate with the center station to receive therefrom the song data so that each karaoke terminal can provide a karaoke service based on the received song data, wherein:

the center station comprises a first transmitter that broadcasts the song data to transmit the same simultaneously to all of the karaoke terminals, and a second transmitter that responds to a request from each karaoke terminal to individually transmit the song data to each karaoke terminal;

each karaoke terminal comprises a first receiver that is capable of receiving the song data broadcasted by the center station, a detector that detects when the first receiver has failed to receive the broadcasted song data for communicating with the center station to notify thereto a request for re-transmission of the song data, and a second receiver that receives the song data re-transmitted from the second transmitter of the center station in response to the re-transmission request; and the center station transmits index information which lists items of the song data to be broadcasted, and each karaoke terminal receives the index information so that the detector checks received items of the song data with reference to the received index information to detect when the first receiver has failed to receive any of the listed items of the song data which is missing from the received song data.

2. A system according to claim 1, wherein the first transmitter of the center station unidirectionally communicates with the first receiver of each karaoke terminal through a wireless communication channel to broadcast therethrough the song data.

3. A system according to claim 1, wherein the second transmitter of the center station can bidirectionally communicate with the second receiver of each karaoke terminal through a wire communication channel to exchange therethrough the request and the song data.

4. A system comprising a center station which transmits song data, and a plurality of karaoke terminals which communicate with the center station to receive therefrom the song data so that each karaoke terminal can provide a karaoke service based on the received song data, wherein:

the center station comprises a first transmitter that broadcasts the song data to transmit the same simultaneously to all of the karaoke terminals, and a second transmitter that responds to a request from each karaoke terminal to individually transmit the song data to each karaoke terminal;

each karaoke terminal comprises a first receiver that is capable of receiving the song data broadcasted by the center station, a detector that detects when the first receiver has failed to receive the broadcasted song data for communicating with the center station to notify thereto a request for re-transmission of the song data, and a second receiver that receives the song data retransmitted from the second transmitter of the center station in response to the re-transmission request; and the center station transmits index information which lists items of the song data to be broadcasted in the form of a time schedule which specifies when each item of the song data is to be broadcasted, and each karaoke terminal receives the index information so that the detector checks received items of the song data with reference to the received index information to detect when the first receiver has failed to receive any of the listed items of the song data which is missing from the received song data according to the time schedule.

5. A system comprising a center station which transmits song data, and a plurality of karaoke terminals which communicate with the center station to receive therefrom the song data so that each karaoke terminal can provide a karaoke service based on the received song data, wherein:

the center station comprises a first transmitter that broadcasts the song data to transmit the same simultaneously to all of the karaoke terminals, and a second transmitter that responds to a request from each karaoke terminal to individually transmit the song data to each karaoke terminal;

each karaoke terminal comprises a first receiver that is capable of receiving the song data broadcasted by the center station, a detector that detects when the first receiver has failed to receive the broadcasted song data for communicating with the center station to notify thereto a request for re-transmission of the song data, and a second receiver that receives the song data retransmitted from the second transmitter of the center station in response to the re-transmission request:

the center station transmits index information which lists items of the song data to be broadcasted, and each karaoke terminal receives the index information so that the detector checks received items of the song data with reference to the received index information to detect when the first receiver has failed to receive any of the listed items of the song data which is missing from the received song data; and the karaoke terminal returns an acknowledgement to the center station when the karaoke terminal receives the index information.

6. A network karaoke system in which a center station distributes song data to a multiple of karaoke terminals, while each karaoke terminal synthesizes a musical sound according to the distributed song data, and mixes the synthesized musical sound with a vocal sound picked up by a microphone, wherein said center station comprises;

first transmitter means to multicast song data to deliver the same to the karaoke terminals, and wherein second transmitter means to transmit song data to each karaoke terminal through a bidirectional wired communication network in response to a request from each karaoke terminal; and wherein each karaoke terminal comprises:

first receiver means to receive said song data multicasted by said center station, means storing a distribution schedule table to keep information concerning the song data to be delivered, detector means to detect existence of missing song data in the delivered song data according to the information kept in said distribution schedule table and according to results of song data reception through said first receiver means, re-transmission requesting means to issue a request for said center station to re-transmit the missing song data detected by said detector means, and second receiver means to receive the missing song data transmitted from said center station in response to the issued request through said bidirectional wired communication network.

7. A method of transmitting and receiving song data to provide karaoke service based on the received song data, the method comprising the steps of:

broadcasting the song data from a center station to transmit the song data simultaneously to karaoke terminals;

responding to a request from each karaoke terminal to individually transit the song data to each karaoke terminal;

receiving the song data broadcasted by the center station through a first receiver of each karaoke terminal;

detecting when the first receiver has failed to receive the broadcasted song data for communicating with the center station to notify a request for re-transmission of the song data;

receiving the song data re-transmitted from a second transmitter of the center station in response to the re-transmission request;

transmitting index information which lists items of the song data to be broadcasted;

receiving the index information; and checking received items of the song data with reference to the received index information to detect when the first receiver has failed to receive any of the listed items of the song data missing from the received song data.

8. A method of distributing song data to a multiple of karaoke terminals to synthesize a musical sound according to the distributed song data and to mix the synthesized musical sound with a vocal sound picked up by a microphone, the method comprising the steps of:

multi-casting song data by a center station to deliver the same to the karaoke terminals;

transmitting song data to each karaoke terminal through a bi-directional wired communication network in response to a request from each karaoke terminal;

receiving the song data multi-casted by the center station;

storing a distribution schedule table to keep information concerning the song data to be delivered;

detecting existence of missing song data in the delivered song data according to the information kept in the distribution schedule table and according to results of song data reception through a first receiver means of each karaoke terminal;

issuing a request for the center station to re-transmit the missing song data; and receiving the missing song data transmitted from the center station in response to the issued request through the bi-directional wired communication network.

* * * * *